May 18, 1965   J. B. RODMAN   3,183,639
PACKAGING APPARATUS
Filed Aug. 26, 1960   10 Sheets-Sheet 1

INVENTOR
JAMES B. RODMAN
BY *Leslie G. Noller*
ATTORNEY

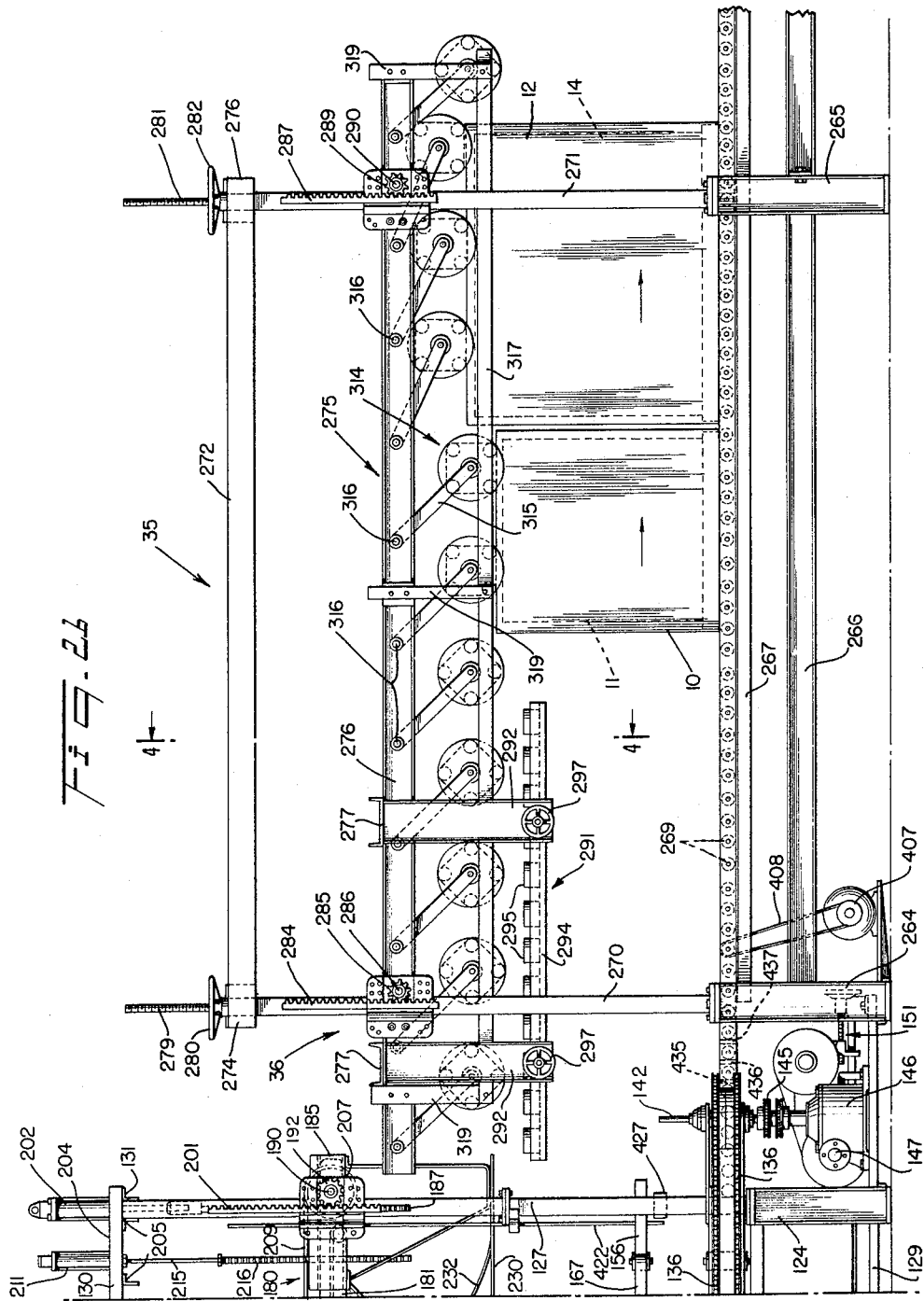

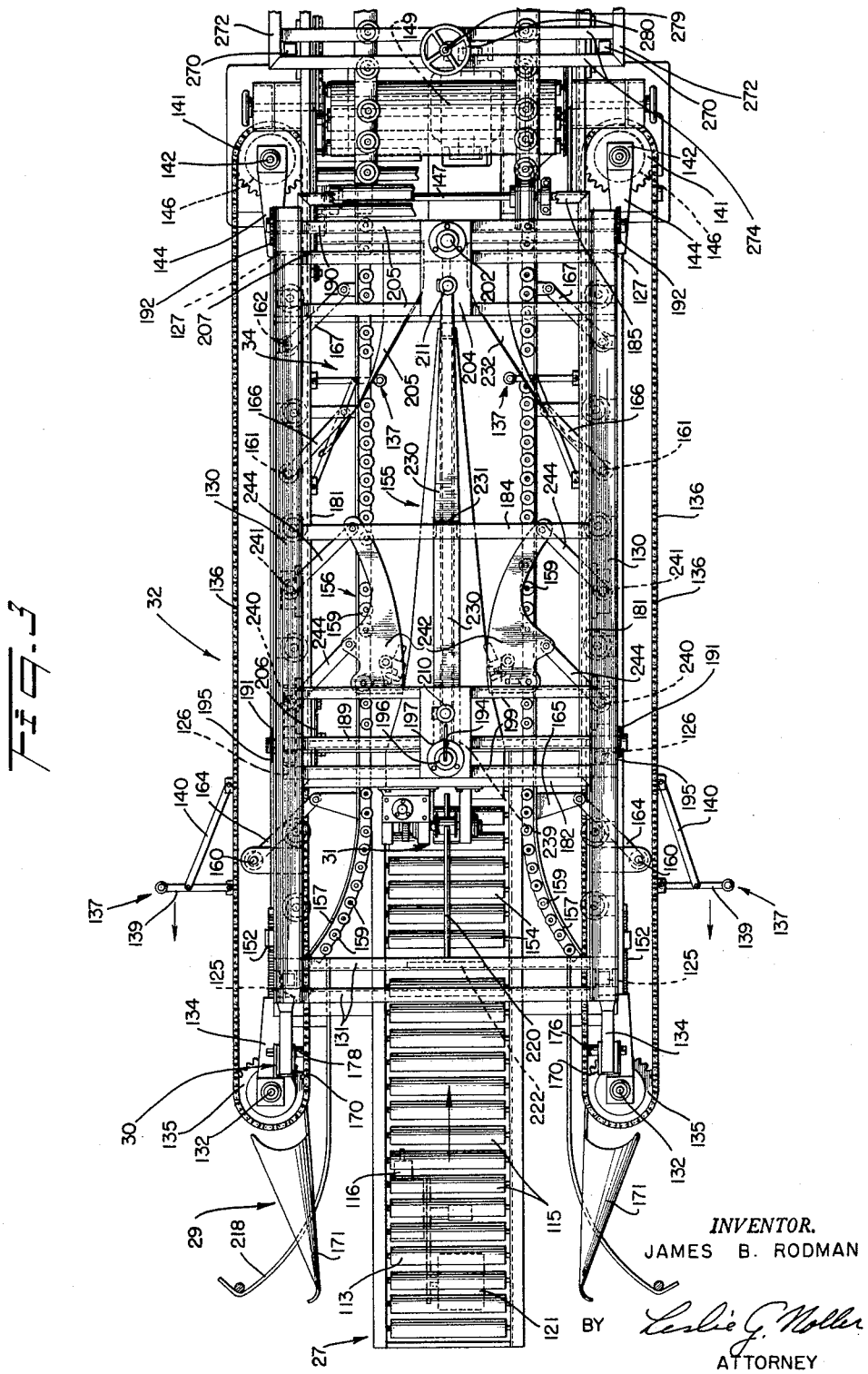

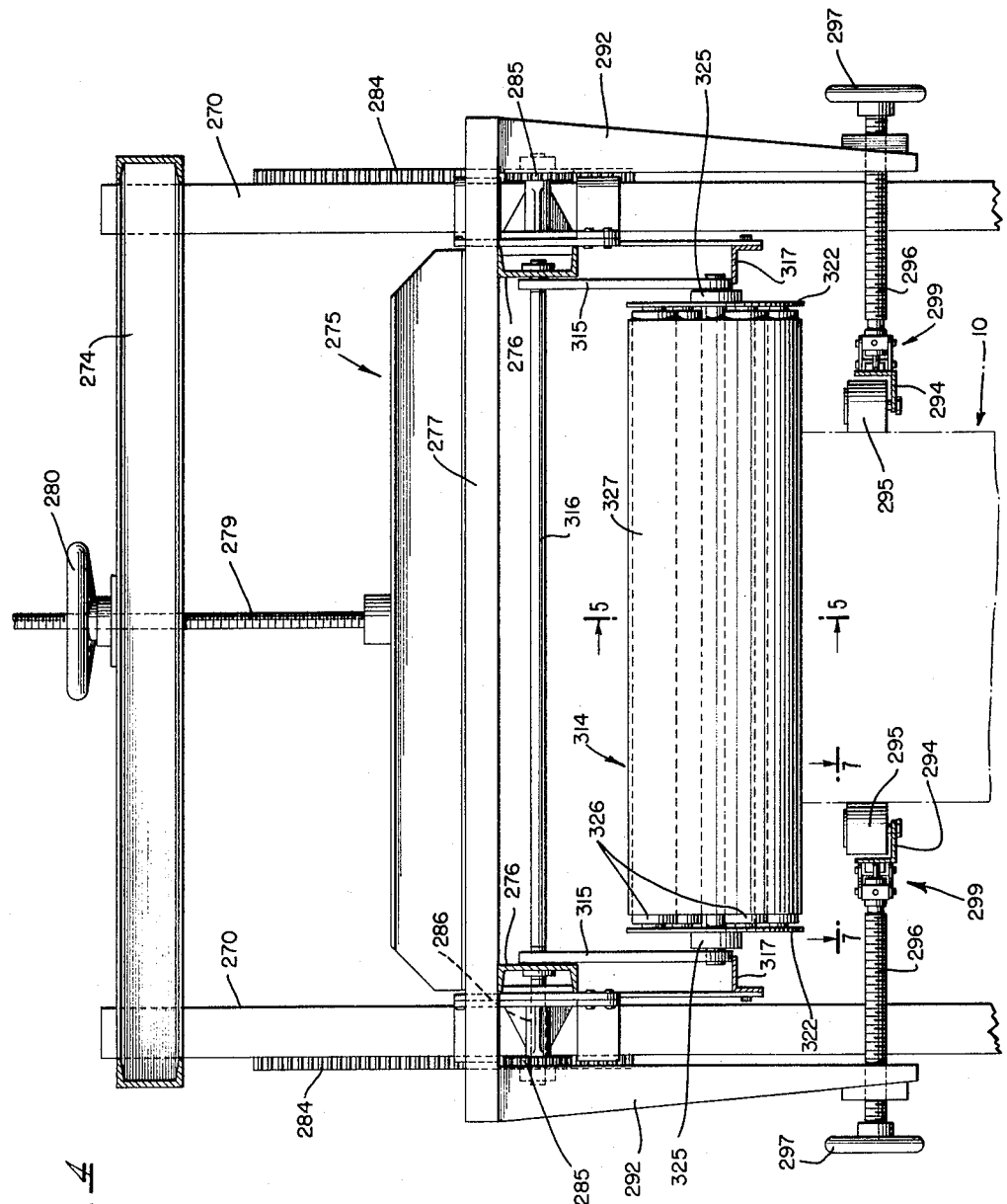

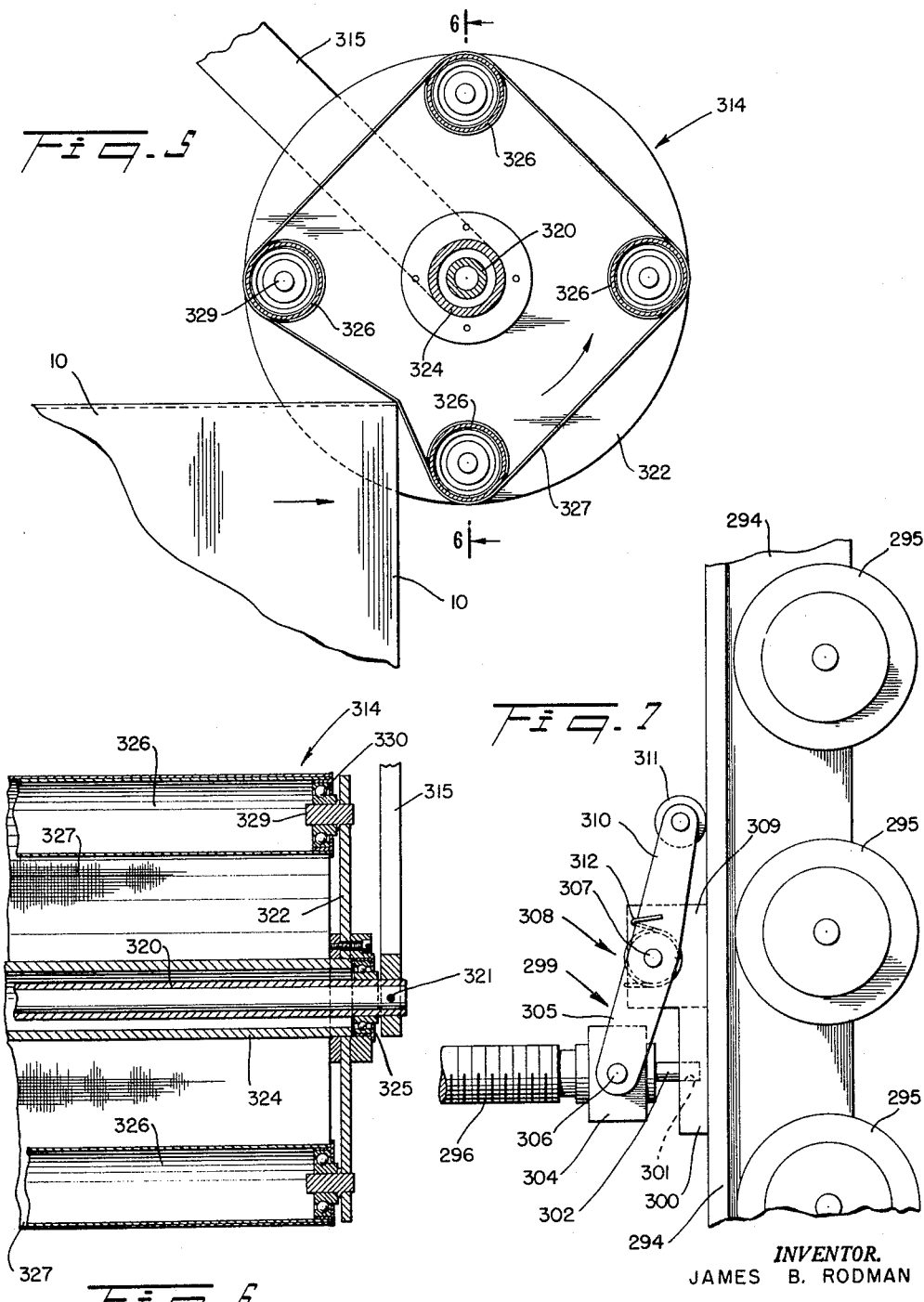

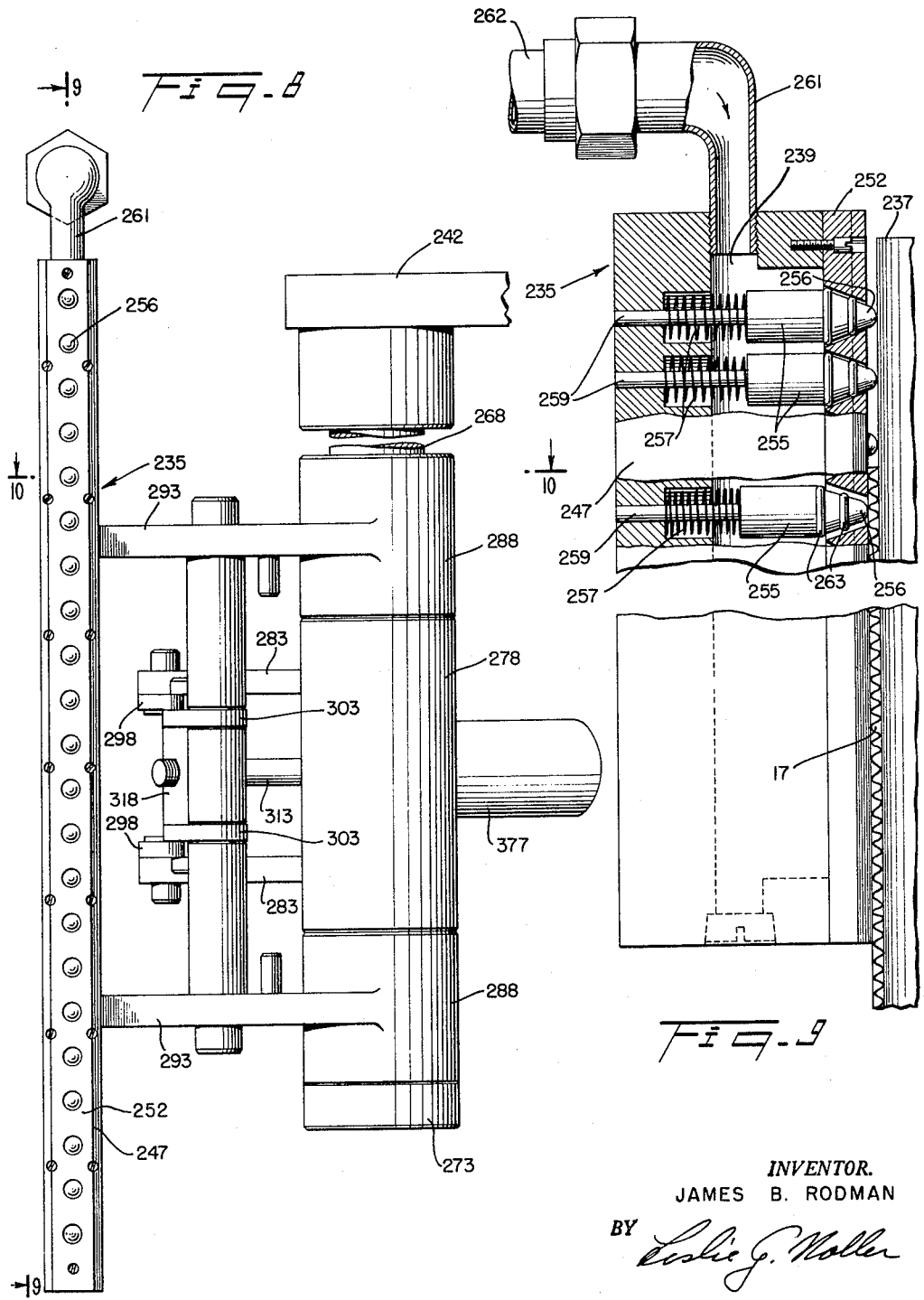

May 18, 1965  J. B. RODMAN  3,183,639
PACKAGING APPARATUS
Filed Aug. 26, 1960  10 Sheets-Sheet 7
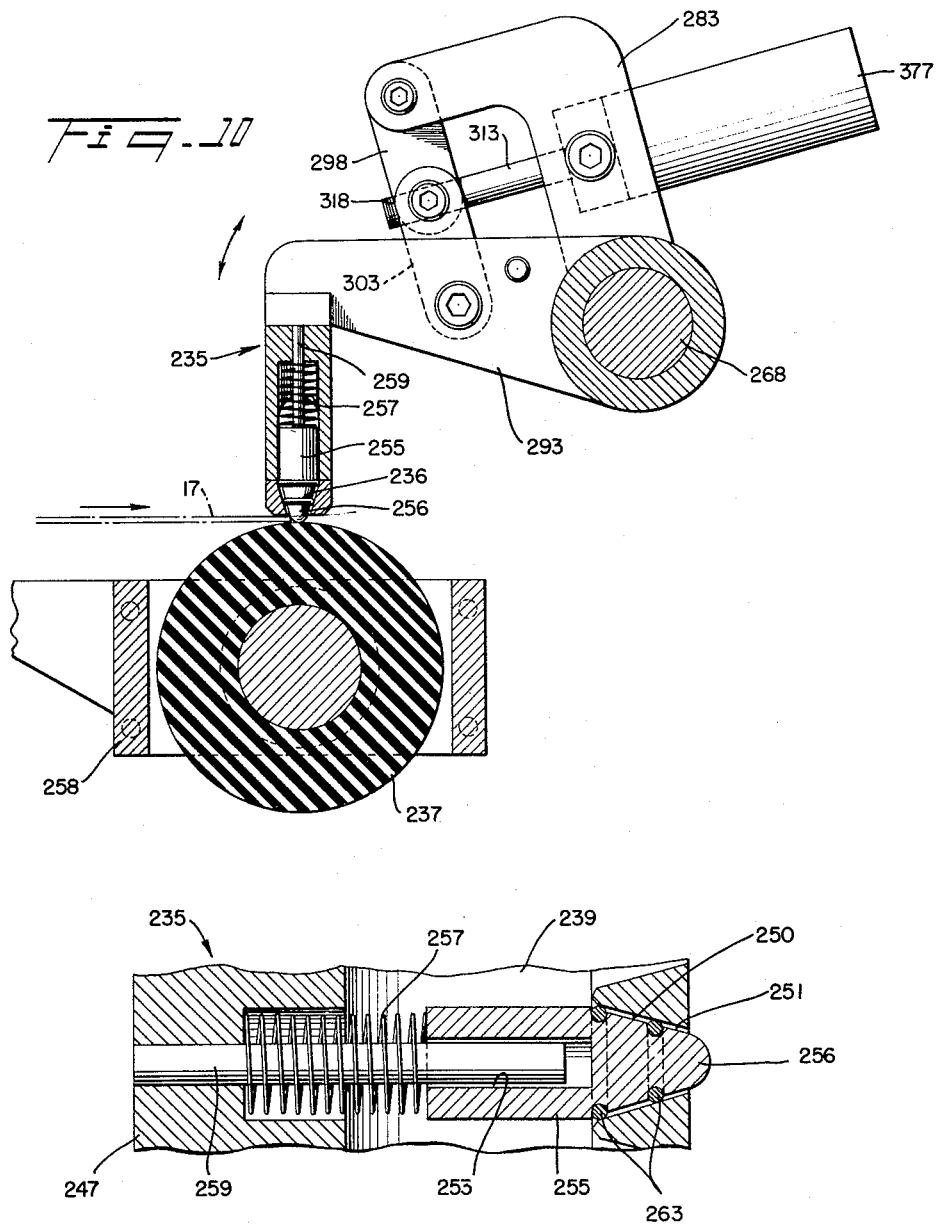
INVENTOR.
JAMES B. RODMAN
BY
ATTORNEY

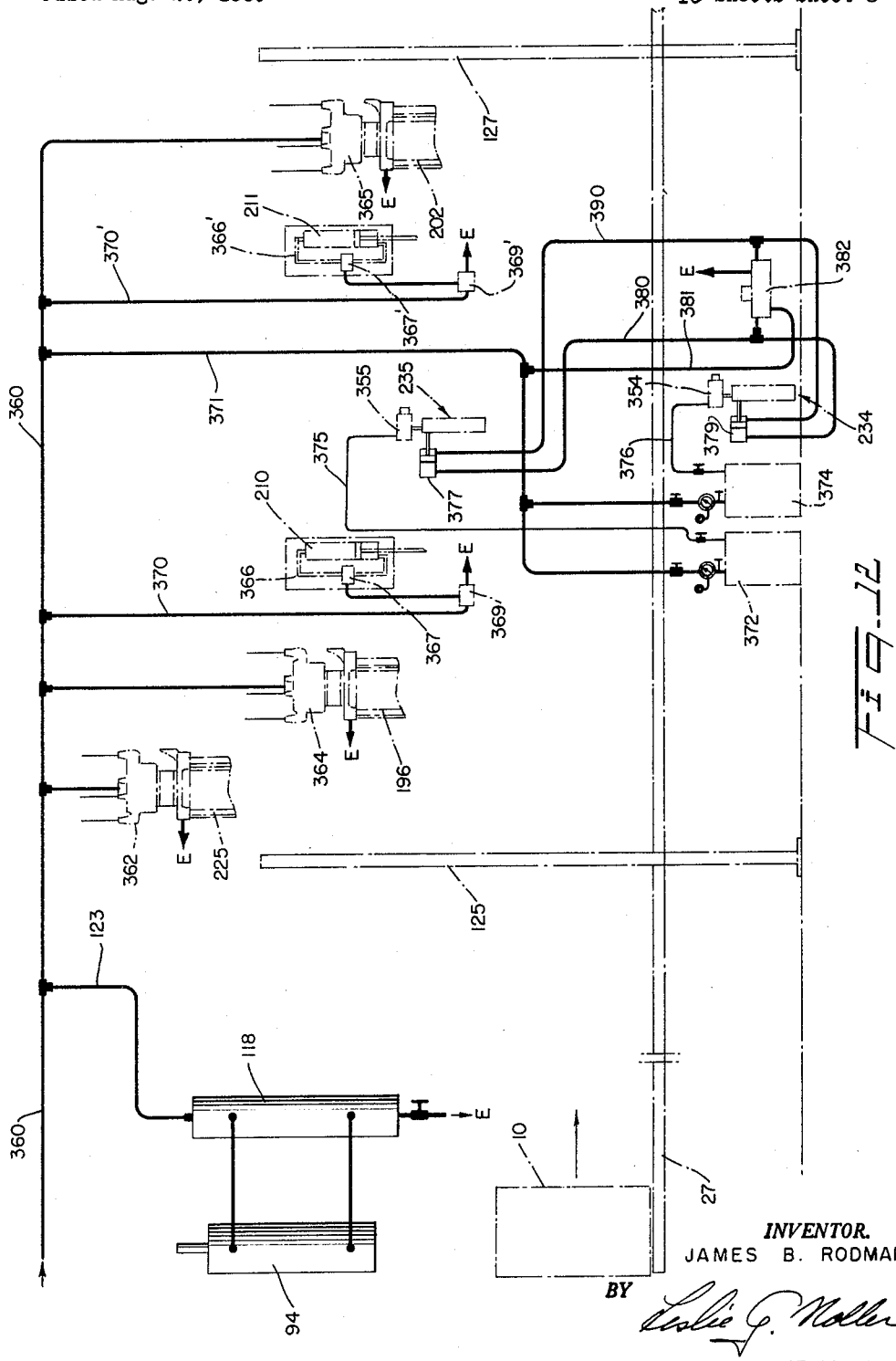

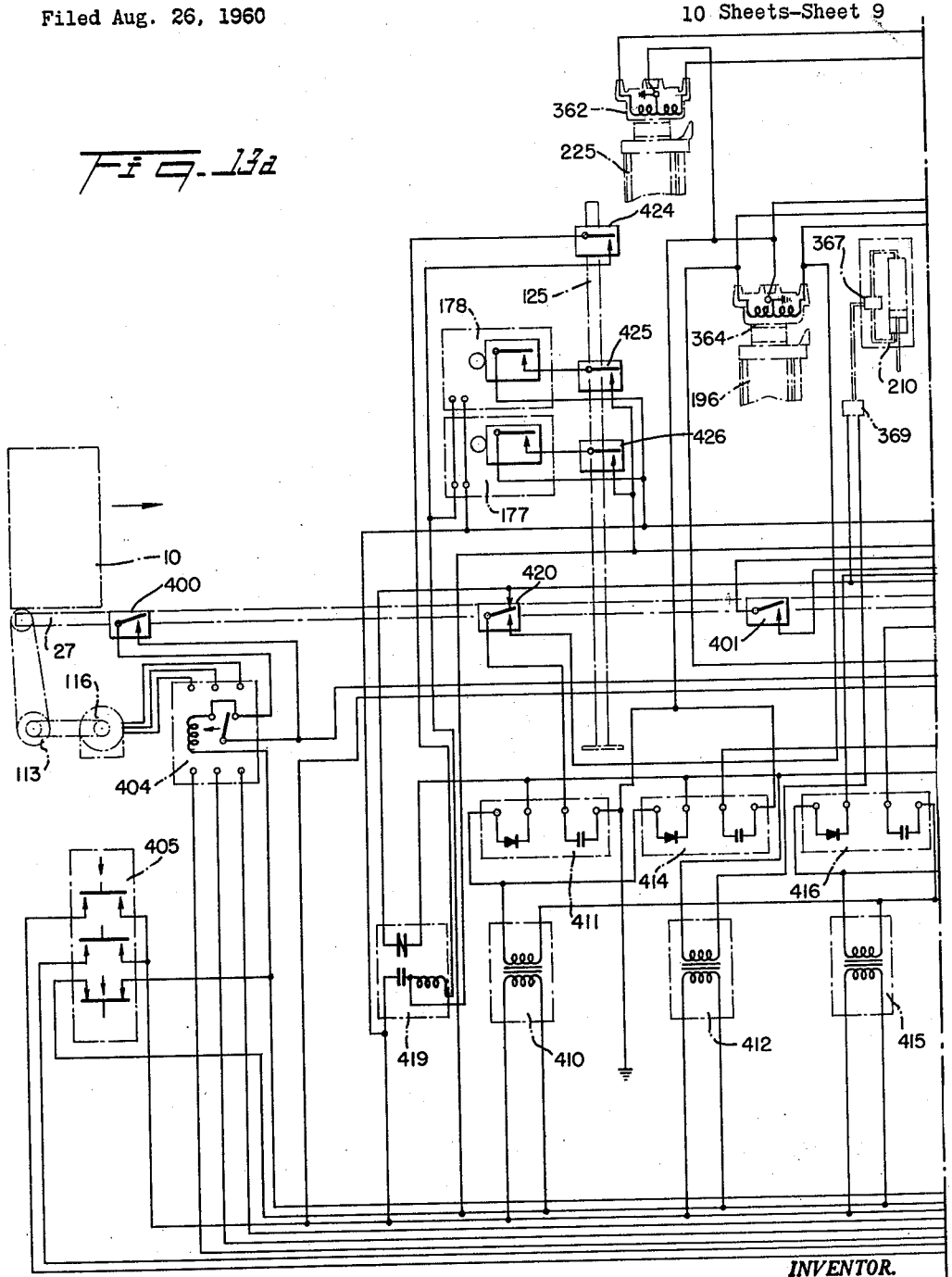

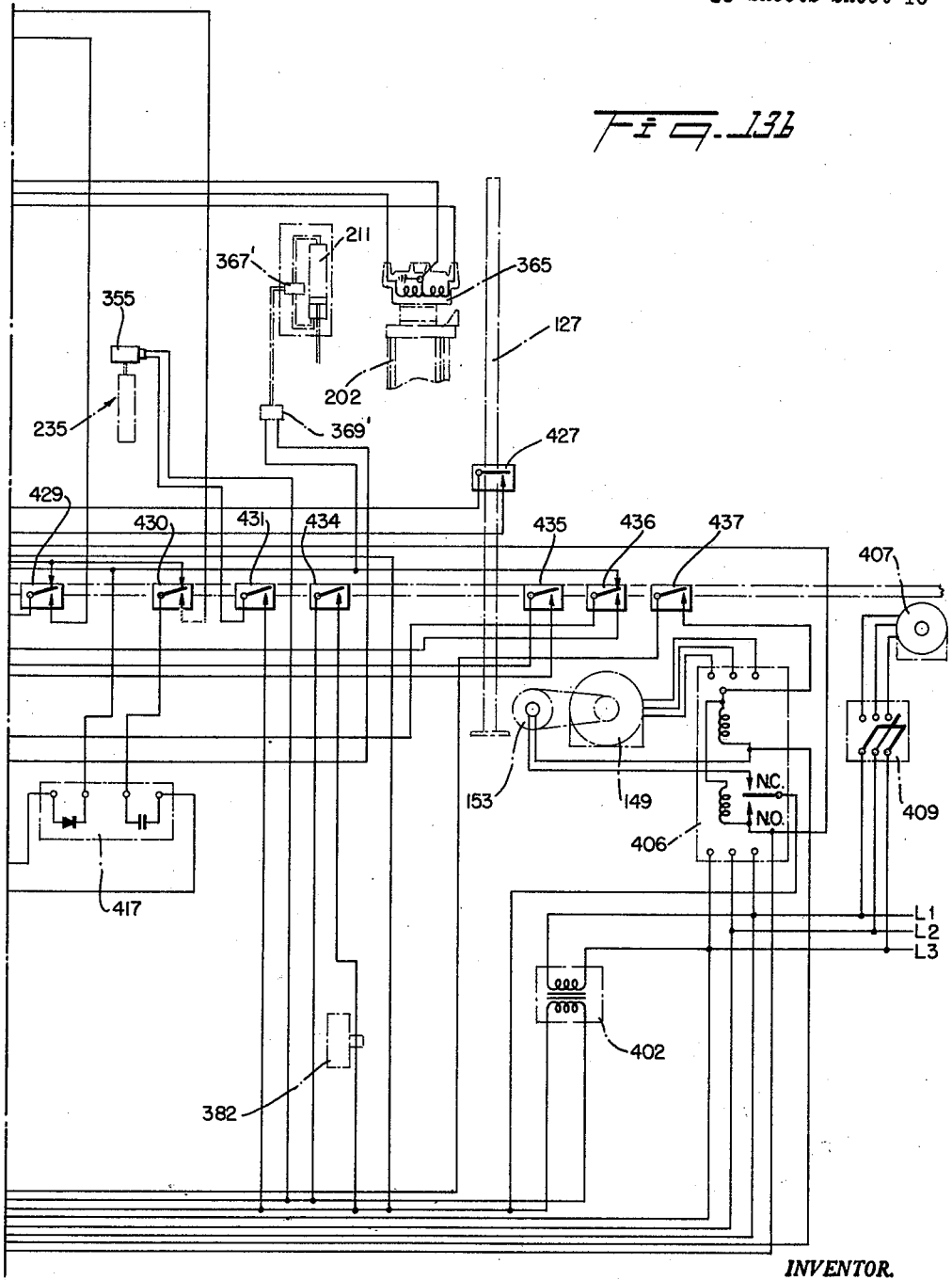

United States Patent Office 3,183,639
Patented May 18, 1965

3,183,639
PACKAGING APPARATUS
James B. Redman, Burlington, N.J., assignor to Weyerhaeuser Company, Tacoma, Wash., a Washington corporation
Filed Aug. 26, 1960, Ser. No. 52,287
23 Claims. (Cl. 53—75)

This invention relates to novel packaging apparatus and to a novel method of packaging. The invention more particularly relates to the packaging of large heavy objects of which washing machines, dryers, and stoves are representative.

The invention has among its objects the provision of an improved apparatus for and method of packaging articles, particularly articles which are large and heavy.

Another object of the invention is the provision of packaging apparatus of the type indicated wherein the elements of the apparatus which cooperate with the upper end of the carton are automatically adjusted in accordance with the height of the carton, whereby the apparatus may rapidly and efficiently sequentially operate upon cartons of different heights.

Still a further object of the invention lies in the provision of improved mechanism for applying glue to the sheet material such as the flaps of a container which are to be adhered together.

Another object of the invention lies in the provision of improved glue applicator mechanism which automatically covers with glue a predetermined area of each size of such flaps.

Yet another object of the invention lies in the provision of improved top presser mechanism for pressing the glue-coated flaps together as the fully closed cartons travel thereunder.

A still further object of the invention lies in the provision of improved driving and controlling means for a carriage-bearing carton processing means cooperating with the upper flaps thereof, whereby the carriage is rapidly and accurately adjusted to the height required by the particular carton being processed.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in perspective of a carton in the condition which it has after having been telescoped at the preliminary folding section over the article to be packaged;

FIG. 2a is a fragmentary view in side elevation of the entering portion of the illustrative embodiment of packaging apparatus made in accordance with the invention;

FIG. 2b is a fragmentary view in side elevation of a portion of the packaging apparatus of the illustrative embodiment adjacent the exit end thereof, FIGS. 2a and 2b together depicting the complete apparatus of the present invention;

FIG. 3 is a view in plan of the entering end of the apparatus shown in FIG. 2a and a portion of the apparatus shown in FIG. 2b;

FIG. 4 is a fragmentary view in vertical section through a portion of the packaging apparatus at the top flap pressing zone of the apparatus, the section being taken generally along the line 4—4 of FIG. 2b;

FIG. 5 is a view in vertical transverse section through a presser member employed in the upper flap pressing zone of the apparatus, the section being taken along the line 5—5 of FIG. 4;

FIG. 6 is a fragmentary view in axial section through the presser member of FIG. 5, the section being taken along the line 6—6 of FIG. 5;

FIG. 7 is a fragmentary view in plan of the means for erecting and truing a closed carton as it progresses through the top flap pressing zone, the view being taken from the point of view of line 7—7 of FIG. 4;

FIG. 8 is a view in end elevation of a glue applicator employed in the apparatus of the invention of the mechanism for applying the applicator to a carton flap;

FIG. 9 is a view partially in vertical section and partially in side elevation through the glue applicator of FIG. 8, the flap-backing pressure roll employed with the applicator being shown fragmentarily in end elevation;

FIG. 10 is a view in horizontal section through the glue applicator and its operating mechanism, the section being taken along the line 10—10 of FIG. 8;

FIG. 11 is an enlarged view in vertical section through one of the glue-dispensing nozzle and valve means of the glue applicator of FIGS. 8, 9, and 10;

FIG. 12 is a schematic line diagram of the air and glue lines for the illustrative embodiment of packaging apparatus; and FIGS. 13a and 13b, when placed side by side in that order with the dot and dash lines thereof in alignment constitute a wiring diagram for the intermediate portion of the apparatus. These figures, when so placed, also indicate the positions in the apparatus of the various limit switches which cooperate with a package in its travel longitudinally of such apparatus.

It is becoming an increasingly common practice to ship large heavy objects such as washing machines and stoves in paperboard cartons rather than in wooden crates. There are a number of reasons for such changes, among them being economy of packaging, the saving of weight and space, and the completeness of coverage and protection of the article. The use of paperboard cartons in the packaging of articles of the type indicated introduces various problems into the packaging operation, particularly when it is desired continuously to support the article from below while folding the bottom flaps of the container upwardly beneath the article. For such preliminary operation, there may be employed, for example, apparatus such as that disclosed in the Webster Brumbaugh United States Patent No. 3,077,062 entitled "Packaging Apparatus and Method" which issued February 12, 1963.

There are other problems which are particularly encountered in plants which produce articles of different sizes and shapes, such articles being delivered to the packaging department in intermixed condition. The apparatus of the invention, in preferred embodiments thereof, further provides apparatus wherein the upper flap folding, gluing, and pressing elements are mounted for vertical adjustment, whereby to cooperate with cartons having different heights extending throughout an appreciable range. In preferred embodiments of the apparatus, such elements are automatically adjusted by a carton height-sensing means, so that the apparatus automatically adapts itself to the processing of cartons of different heights within its operative range.

Before describing the apparatus of the invention, first generally, and then in detail, it will be well to describe a carton such as that processed by the apparatus, and typical articles to be packaged therein. In FIG. 1 there is shown a paperboard carton 10 in open, unfilled condition, in much the same condition which it has after it has been first applied to the article. A typical article to be packaged, fragmentarily shown in FIG. 2a, is generally designated 11. Such article 11 may have a somewhat smaller length and height than another container 12 (FIG. 2b) employed for a somewhat larger article processed by the same packaging apparatus. The apparatus of the invention is designed to process containers having dimensions lying within appreciable ranges of length, height, and width.

The articles to be packaged in accordance with the invention, that is, articles such as that shown at 11, are provided with skids 15 integrally attached to the base of the article and travelling therewith until it reaches its ultimate destination. The article to be packaged, mounted upon its skid, is supported from below in such manner that the open bottomed container 10, in the condition shown in FIG. 1, may be telescoped thereover. Following this, the trailing bottom flap 17 of carton 10 is first folded up into horizontal position beneath the skid 15 of the article, and the leading bottom flap 16 is then folded up into horizontal position beneath the article. These operations may be performed, for example, by the apparatus which is the subject of the abovementioned Brumbaugh application. The apparatus of the present invention folds the trailing and leading upper flaps 22 and 21, respectively, inwardly into horizontal position over the article, applies glue or other suitable adhesive to the outer, lower, and upper side flaps 19 and 24, respectively, and the inner, lower, and upper side flaps 20 and 25, respectively, and then folds such coated side flaps over the ends of the carton and presses them against each other in sealing relationship.

In FIG. 2a there is shown a fragment of the leading and trailing bottom flap-folding apparatus which is the subject of the Brumbaugh application. Such apparatus is generally designated by the character 26. After leaving such apparatus 26, the carton, having the article disposed therewithin, travels sequentially to sections or stations 29, 30, 31, 32, and 34. At section 29 the upper side flaps of the carton are erected. At section 30 the height of the carton is sensed by suitable mechanism. Such mechanism controls means for adjusting the vertical position of the elements of the apparatus which (1) at station 31 cooperate with the upper flaps of the carton to fold the leading and trailing upper end flaps of the carton, (2) at station 32 apply glue to the confronting surfaces of the upper side flaps which are to be the inner surfaces thereof, and (3) thereafter, at station 34, fold the upper side flaps downwardly into horizontal position. At such latter two stations, corresponding means are provided for treating the bottom side flaps of the carton, first to apply glue to the confronting surfaces thereof, and then to fold such bottom side flaps upwardly into horizontal position beneath the article.

Upon leaving the stations for thus folding the upper and lower side flaps of the carton, the carton enters a station, generally designated 35, wherein it is erected or trued at a substation 36, and the upper flaps are repeatedly subjected to presser elements, both during the truing of the carton and thereafter, whereby the upper flaps are firmly adhered to each other. The thus finally closed cartons are then delivered in sequence to the exit end of the apparatus.

The preliminary, trailing and leading bottom flap-folding apparatus 26 may, if desired, be positioned remote from the first and second sections or units of the apparatus of the present invention, being then spaced therefrom by one or more conveyors of very substantial length. In the illustrative apparatus, however, the apparatus 26 is located immediately adjacent the first section, being spaced therefrom by a short conveyor 27 having sufficient length to support one or two of the largest containers or cartons which the apparatus is called upon to process.

The apparatus of section 26 has two parallel chains 46 making up a conveyor 45. Conveyor 45 is selectively driven by a motor 62 through a speed reducer 64. A retractable stop 87 retains the article 11 and its carton 10 from movement when the conveyor 45 is functioning to fold the lower trailing flap upwardly beneath the article. Following this, the stop is retracted to allow the article and its carton to move forwardly to fold the lower leading flap upwardly beneath the article.

In the latter part of the forward travel of the packaged article on conveyor 45, in the apparatus shown, the forward edge of the carton 10 contacts the operating arm of a switch 400 in the circuit of a motor 116 which drives one or more terminal rolls 114 of section 26 and the rolls 115 of an aligned further conveyor 27. As shown in FIG. 2a, motor 116 is connected to a speed-reducing mechanism 113. The speed-reducing mechanism 113 is connected to a still further speed-reducing mechanism 121 by means of a speed varying "Roto Cone" device having pulleys of selectively variable effective diameter ratio connected by a belt 120. The ratio of the speeds of rotation of such pulleys may be varied by adjusting the longitudinal position of motor 116 and its pulley by a motor-adjusting screw 118 as shown.

The output shaft of speed-reducing mechanism 121 is connected by suitable sprocket and chain means to the conveyor rolls 114 and 115. The various conveyor rolls of each set are connected to be driven in synchronism by chain and sprocket means (not shown). As will appear hereinafter, the article and its encasing carton, which is now forwarded by power into and through the first unit of the apparatus, itself determines the sequencing of subsequent operations thereon and determines the height to which the elements operating upon the upper flaps of the carton are adjusted.

The first unit of the apparatus of the present invention, which includes the right hand three-quarters of FIG. 2a and the left hand end portion of FIG. 2b, has a base frame portion generally designated 122 which is made up of suitable longitudinal and cross-frame members connected to and supported by longitudinally spaced sub-columns 124. Such sub-columns 124, as apparent in FIG. 3, are arranged in pairs, the respective members of which are disposed on opposite sides of the apparatus. Rising above and connected to sub-columns 124 are rear columns 125, intermediate columns 126, and front columns 127. The upper ends of columns 125, 126, and 127 are connected along each side of the apparatus by an upper longitudinal frame member 130. The lower ends of the sub-columns are connected by longitudinally extending members 129. The upper longitudinal members 130 are connected by cross-frame members 131.

The forward end of driven roller conveyor 27 extends into the second unit for an appreciable extent, the forward end of frame members 133 of conveyor 27 being supported upon a cross member (not shown) extending between and supported by the rear sub-columns 124. The first unit includes a further, opposed chain type conveyor which longitudinally overlaps to an appreciable extent the conveyor 27, so that the chain type conveyor receives packaged products delivered thereto from the roller type conveyor 27. The chain type conveyor has opposed lugs 137 moving in synchronism to engage the rear edge of the packaged article. After the article has been thus engaged by the lugs, it is moved off the rear portion of the roller conveyor 27 onto a further conveyor having a bottom central skid 155 and side guiding rollers 159, as shown.

The two sides of the chain type conveyor are identical. Each side has a rear vertical idle sprocket shaft 132 which is journalled in a supporting bracket 134 extending from the rear of the frame of the first unit. The shaft 132 mounts two vertically spaced rear sprockets 135. Parallel chains 136 are entrained about the respective sprockets 135, the chains mounting between them one or more (two shown) transverse carton-propelling arms 139 which are provided with angularly rearwardly extending braces 140. The forward ends of chains 136 are entrained about vertically spaced driving sprockets 141 which are mounted upon a vertical shaft 142 journalled in a forwardly extending supporting bracket 144 connected to the frame. Shaft 142 is drivingly connected by a flexible coupling 145 to the vertical output shaft of a gear-reducer 146. The gear-reducers 146 for the respective chain pairs 136 are connected in transverse alignment whereby they are driven by a common transverse drive shaft 147. An electric motor 149 provided with change speed mechanism of the "Roto Cone" type is drivingly connected to shaft 147, as shown. A plugging switch 153 is driven in synchronism with motor 149, as shown in FIG. 13b. Such switch 153 restores the circuit for motor 149 to condition to be started again after having been automatically opened. The speed ratio between the output shaft of the motor 149 and shaft 147 is adjusted by changing the longitudinal position of the motor by a screw means such as shown at 151. Conveyor chains 136 are suitably adjusted as to tension by screw type adjusting means 152 which move the shafts 132 forwardly or rearwardly, as required. Motor 149, driving conveyor chains 136, is started by the tripping of switch 401 by the packaged article as it travels along conveyor 27, as will be more particularly described in connection with FIGS. 13a and 13b.

The packaged article, now propelled by arms 139 of the opposed chains 136, is at first supported at the exit end of roller conveyor 27 upon the above mounted idle rolls 154 and later upon a longitudinally center skid member 155, the width of which progressively decreases in a forward direction as shown in FIG. 3. In order to center the packaged article and to hold it upright, particularly when it is supported upon skid member 155, there are provided opposed laterally adjustable side guiding members or rails 156. The entering ends of guide rails 156 are curved or flared, as shown, whereby to lead the packaged article within the guide rails and to center it therebetween. Guide rails 156 support a plurality of closely longitudinally spaced guide rolls 159 journalled thereon on vertical axes. Each of guide rails 156 is mounted for adjustment parallel to its end toward and away from the longitudinal central line of the apparatus. The mounting means for each rail 156 comprises a rear vertical rock shaft 160, an intermediate vertical rock shaft 161, and a forward vertical rock shaft 162. Rails 156 are connected to the rock shafts through the medium of crank arms 164, 166, and 167, the outer ends of the crank arms being connected to the rails by brackets, of which the rear one is designated 165. The rock shafts on the two sides of the apparatus may be connected together by means of crank arms on the bottom ends thereof and cross links between the crank arms on opposite sides of the apparatus whereby the two rails 156 simultaneously move equal distances in opposite directions, so as to maintain the packaged article in centered position as it travels through the second section. This can be done automatically by a carton width sensing mechanism, similar to the carton height scanning mechanism shown at 30, that controls the adjustment of the rails.

The article propelling arms 139 of the chain type conveyor are of sufficient transverse length to extend appreciably inwardly beyond the guiding rollers 159 on rails 156 in the most inwardly adjusted position of the latter. Consequently, it is not necessary, in the embodiment of the apparatus shown, to provide for the lateral adjustment of the chains of the chain type conveyor toward and away from each other in order to accommodate cartons having an appreciable range of widths. Before continuing with the further description of the construction and method of operation of the first section of the apparatus, it will be well to describe the position of the various flaps at both the top and bottom of the carton after the carton and its contained article have left the preliminary folding section 26.

*Position of the flaps on a filled carton entering the apparatus of the invention*

Before the carton 10 and its contained article have left the preliminary folding station 26, the trailing and leading inner flaps 16 and 17, respectively, will have been folded horizontally beneath the article. The bottom side flaps 19 and 20 are spread laterally outwardly, as shown in FIG. 1, and the upper flaps preferably initially occupy the down-folded positions shown in FIG. 1. During travel of the carton and article from section 26 onto the rear end of conveyor 27, the operator manually erects the forward and trailing upper flaps 21 and 22 into a somewhat inwardly inclined position, past the vertical as shown in dotted lines in connection with the carton which is shown in FIG. 2a passing through the first zone 29 of the first section.

*The carton scanning mechanism*

At station 29 the first section of the apparatus of the invention is provided on each side thereof with generally parallel plate-like structures which are supported, as shown, upon the respective rear columns 125. At the rear end of each such plate-like structures there is provided a plow 171, of conventional structure, which has a rearwardly tapering body and a nose portion designed to enter beneath the leading edge of the respective upper side flap 24, 25 and raise such flaps until they occupy the vertical position on each side of the flaps 21, 22 as they pass between the opposed parallel vertical plates 170.

Each of plates 170 is provided with a vertical slot 174 of appreciable length. Along the rear edge of slot 174 there is provided a vertical rod support 175 which is mounted upon the bracket 172 on column 125. Upon one of rods 175 there is mounted one or more (two shown) vertically adjustable light sources 176 which direct collimated beams of light transversely of the apparatus toward the slot in the other plate 170. Upon the rod 175 of said other plate is mounted an equal number (two shown) of vertically adjustable photoelectric cells 177, 178 which may be placed in alignment with the respective light sources 176. The photoelectric cells 177, 178 function, in a manner particularly to be described hereinafter, to scan the height of the erected side flaps of the particular carton travelling therepast. Such cells act with vertically disposed limit switches, to be described, to adjust a vertically adjustable carriage, generally designated 180, within the first section of the apparatus whereby the glue applicator, flap folding mechanisms, and flap hold-down skid are correctly vertically positioned for the particular carton being processed.

*The vertically adjustable, upper flap-treating, carriage*

Carriage 180 includes two laterally spaced longitudinal members 181 connected by rear cross members 182, intermediate cross-member 184, and forward cross-member 185. The thus formed frames of the carriage are provided with a rear-cross shaft 189 and a forward cross-shaft 190, such shafts having pinions 191 and 192 thereon, respectively. Pinions 191 mesh with stationary vertical rack gears 195 on columns 126, and pinions 192 mesh with vertical stationary rack gears 201 on vertical columns 127. Shafts 189 and 190 are maintained in synchronism by a longitudinally extending chain 209 which extends between them and is entrained over sprockets 206 and 207 on shafts 189 and 190, respectively. The thus described cross-shafts, pinions, and rack gears maintain the two opposite rear corners, and the two opposite forward corners, of the carriage at the same level as the carriage is adjusted vertically.

The carriage 180 is vertically adjusted as required by two fluid motors 196 and 202, disposed vertically centrally of the carriage at opposite ends thereof. The carriage is held stably in vertically adjusted position by means of two further fluid motors 210 and 211, likewise disposed centrally of the carriage adjacent the ends thereof. As shown in FIGS. 2a, 2b, and 3, vertical fluid motors 196 and 210 at the rear of the apparatus are supported on a horizontal platform 197 affixed to cross members 199. Motors 202 and 211 are supported on a horizontal platform 204 which is affixed to frame cross-members 205.

The manner of connection of such fluid motors to the fluid circuit of the apparatus, and the manner of control of such motors will be more readily apparent upon consideration of FIGS. 12 and 13 which show, respectively, the fluid and electrical control circuits for the apparatus. It will be sufficient here to describe the mechanical means whereby the motors adjust and hold carriage 180.

Carriage 180, supported by fluid motors 196 and 202, is connected to the motors by means of threaded extension 186 at the rear of the carriage and threaded extension 187 at the front end of the carriage. The extensions are coupled to the piston rods of fluid motors 196 and 202. The motors, connected to a source of fluid pressure through suitable reversing valves to be described, selectively drive the carriage downwardly or upwardly as desired.

Carriage 180 is, as was above noted, held in adjusted position by the rear and forward fluid motors 210 and 211. The piston rod 212 of motor 210 has an elongated screw 214 thereon which is adjustably threadedly engaged with a nut disposed on the longitudinal center line of the carriage 180 at the rear end thereof. Motor 211 is similarly connected to the forward end of carriage 180, the piston rod 215 having an elongated screw 216 connected to the lower end thereof, such screw being received in a nut disposed on the longitudinal center line of the carriage at the forward end thereof. As will be more clearly apparent upon discussion of the control circuits for the apparatus, motors 210 and 211 function to hold carriage 180 securely in the required vertical position after it has been moved to such position by motors 196 and 202.

The apparatus is provided with lower side flap folding means 218, positioned as shown in FIGS. 2a and 3, whereby the bottom side flaps 19 and 20 of the carton are folded down from the horizontal position, shown in FIG. 1, which they occupy when the carton emerges from the preliminary folding section 26, into a vertical position, indicated in FIG. 2a. While in such vertical position, the inner surfaces of flaps 19 and 20 are coated with glue at the gluing station 32, to be described hereinafter.

The first unit of the apparatus of the invention includes, at zone 31, means for folding the upper leading flap 21 and the upper trailing flap 22 downwardly into horizontal position. It will be assumed that the carriage 180 has been adjusted vertically to the correct position for the carton 10 then entering the first section. As the carton moves forwardly, its forward upper edge enters under the forwardly and downwardly inclined entering end 229 of a central hold-down guide 230, the main extent which extends longitudinally centrally above the carton. The portions 229 and 230 of the hold-down function, respectively, to fold flap 21 downwardly to a horizontal position and to maintain it in such position during the forward travel of the carton.

The apparatus includes a further means for the folding downwardly of the trailing upper flap 22. Such mechanism includes a short centrally positioned horizontal shaft 219 journalled in a rearwardly projecting extension 217 on the frame of carriage 180. An arm 220 projects radially from shaft 219, such shaft carrying at its rear frame end an arcuately downwardly extending portion 221. Portion 221 carries a relatively short cross flap-engaging bar 222 on the lower end thereof. On a vertical support 224 lying generally above structure 217 there is a vertically disposed reciprocable air motor 225. The lower end of the piston rod of air motor 225 carries a vertically depending rack gear 226 which meshes with a pinion 227 which is fast to shaft 219. It will be seen that when air motor 225 is actuated to raise its piston rod, the flap engaging bar 222 travels arcuately downwardly to lie at least vertically below shaft 219, and that when the air motor is operated in the reverse direction, the cross bar 222 is returned to the position shown in FIG. 2a. The apparatus includes a switch 429 (FIGS. 13a and 13b) which is closed by the carton to impel with the piston of motor 225 upwardly when the carton 10 has reached the correct position of travel so that bar 222 folds flap 22 horizontally downwardly. A relatively small further forward travel of carton 10 actuates a switch 430 (FIGS. 13a and 13b) whereby to lower the piston of motor 225 to restore bar 22 and its operating means to the position of FIG. 2a. By this time, the leading edge of flap 22 will have traveled well past the rear edge of the entering end 229 of the hold-down guide, so that both flaps 21 and 22 are firmly held downwardly in a horizontal position by the main portion 230 of the hold-down guide.

*Glue applicators*

At station 32 of the apparatus there are located upper and lower glue applicators whereby to coat predetermined areas of the free edge of the confronting upper and lower flaps with glue. One of the two upper glue applicators is shown in FIG. 2a at 235. One of the two lower glue applicators is shown in such figure at 236. It is to be understood that the glue applicators on the respective sides of the machine face in opposite directions, whereby to coat the laterally oppositely facing surfaces of the upper side flaps 24 and 25 and the lower side flaps 19 and 20. The upper and lower glue applicators on the respective sides of the apparatus are preferably mounted in alignment, as shown, and are mounted on supports which are connected by appropriate linkage so that the upper and lower glue applicators on the respective sides of the machine remain in vertical alignment with each other while the applicators on the two opposite sides of the machine are moved inwardly and outwardly equal amounts, as required, from the longitudinal center line of the apparatus.

Each of the glue applicators shown, which will be described more particularly in connection with FIGS. 8–11, inclusive, has a glue applicator body and a confronting parallel flap guiding and spacing means which, in the embodiment shown, is a vertically disposed guide roll, the roll for the upper applicator being designed 237 and the roll for the lower applicators being designed 239.

The upper and lower glue applicators at each side of the apparatus are supported upon and adjusted by two longitudinally extending horizontal plate members supported by spaced vertical rock shafts 240 and 241. The supports for the upper glue applicators, designated 242, are in each instance, supported from their respective rock shafts 240 and 241 by crank arms 244 extending from the rock shafts and pivotally connected to the respective supports 242 by pivot pins, as shown. The lower glue applicator 236 is supported in generally the same manner, there being a horizontally disposed supporting plate 245, to which the lower applicator is secured, which is supported upon rock shafts 240 and 241 through the medium of the crank arms 246 which are pivotally connected to the supporting plate 245. The rock shafts 240 and 241 on the respective sides of the apparatus are connected together to rotate synchronously in opposite directions as required to accommodate cartons of different widths, by crank arms and a connecting cross link (not shown) extending across the machine at the bottom thereof.

In the embodiment of apparatus shown, elements of the apparatus in the first unit thereof which cooperate with the upper and lower side flaps of the carton, and which center the carton per se, such as the bottom retaining guide, the bottom folding guides 234, the opposed side guides 156, the glue applicators, and the subsequent side flap folding means 232 and 234, to be described, are under the manual control of the operator who adjusts them as required in accordance with the width of the carton to be treated. It is to be understood that, within the scope of the present invention, such side flap treating elements may be made to be laterally adjusted automatically by carton width sensing mechanism controlling power operated lateral adjusting means. A suitable carton width sensing means may be, for example, a photoelectric scanning means such as that shown at 30, and above described, for sensing the height of the carton to be treated.

In FIGS. 8–11, inclusive, there is shown in detail the construction of an upper glue applicator 235. The lower glue applicators have substantially the same construction. Applicator 235 has a vertically disposed elongated body 247 which is adjustably mounted upon and depends from the above-described laterally adjustable plate 242. Body 247 has a forward cover plate 252, plate 252 having a plurality of vertically spaced horizontally extending transverse frusto-conical passages 250 therethrough, passages 250 being centrally vertically disposed in a row and communicating with the longitudinal passage 239. The outer end 251 of each transverse passage 250 is somewhat smaller in diameter than the rear end. A horizontally reciprocable valve body 255, having a round ended forward frusto-conical nose portion 256 complementary to passage 250, is constantly urged into its outer, passage-closing position by a coil compression spring 257 which at its rear end is telescoped over a spring-holding pin 259 in body 247. The forward end of pin 259 slidingly extends within an axial bore 253 in valve body 255, whereby the valve body is accurately maintained in alignment with the valve seat forming passage 250.

The flap-guiding and backing roll 237 is journalled to turn about a vertical axis in a bracket 258 secured to supporting plate 242 so as to confront the aligned vertical glue-dispensing orifices in body 247. Roll 237 is adjusted laterally by adjustment of plate 242 so that the respective side flap of the carton 10 engages the roll tangentially as the flap passes by the roll. The rounded nose portion 256 of valve body 255 extends outwardly somewhat from cover plate 252, when the valve is closed, a distance which is at least slightly less than the thickness of the flap. Thus each of the orifices is closed and dispenses no glue when there is no sheet of material such as flap 17 travelling between such orifice on the applicator body 247 and the roll 237. To insure sealing of passages 250 by valve bodies 255, the nose portion of each valve body is provided with two O rings 263 disposed in grooves therein, as shown. When, however, applicator 235 is advanced to the position of FIG. 10, a flap 17 entering between the applicator and the roll actuates those valves which it confronts, whereby to cover the outer free edge of the flap with glue. The end valves, in this case the three upper ones shown in FIG. 9, which lie above the upper edge of flap 17, remain closed. It will thus be seen that the applicator of the invention acts automatically to sense the transverse extent of the flap to be coated and restricts the dispensing of glue to such transverse extent. The passage 239 of applicator body 247 is supplied with liquid glue under pressure through an L-shaped fitting 261 secured to the upper end of the bore, there being a glue-conducting flexible conduit 262 connected to fitting 261, as shown. Conduit 262 is connected to a suitable source of liquid glue under pressure, designated generally by the reference characters 372, 374 in FIG. 12. The glue applicators are automatically moved away from the respective backing rolls when there is no carton approaching or passing through the glue applicator zone, and are moved into the position shown in FIG. 10 immediately in advance of the passage of a carton flap between the glue applicator and the backing roll. The manner of support of each of the glue applicators to permit such movement is shown in FIGS. 8 and 10.

As there shown, a vertical rod 268 is fixedly secured to supporting plate 242; rod 268 has an enlarged bottom end 273. Fixedly secured to rod 268 intermediate the length thereof is a sleeve 278 from which extend integral upper and lower L-shaped arms 283. Above and below sleeve 278 are hub members 288 which are free to rotate with respect to the rod. Parallel upper and lower arms 293 integrally attached to hub members 288 are attached at their outer ends to the body of applicator 235. Upper and lower toggle links 298, 303 are connected at their inner ends and are pivoted at their outer ends to arms 283 and arms 293. The parts are so proportioned and adjusted that the links 298 and 303 are disposed in a straight line when the glue applicator is in the operative position of FIG. 10.

A reciprocable fluid motor 377 is affixed to a lateral extension of sleeve 278. The piston rod 313 of motor 377 is attached at its outer end to a fitting 318 which is pivotally secured to the inner ends of links 298, 303. It will be apparent that when air under pressure is admitted to the left hand end of motor 377 (FIG. 10) piston rod 313 will be retracted and toggle 298, 303 collapsed to swing the glue applicator clockwise and thus away from its roll 237. When air under pressure is admitted to the right hand end of motor 377, the toggle will be straightened toward the position of FIG. 10, thereby swinging the glue applicator into its operative position. A suitable stop, not shown, is provided to position the applicator accurately in the position of FIG. 10. A motor 377 is actuated in timed sequence to the passage of a carton through the apparatus by control mechanism to be more fully discussed in connection with FIGS. 12 and 13.

*Operation of the first unit of the apparatus*

The forward progress of the carton 10 through the apparatus from the position thereof shown in FIG. 2a at the scanning station will now be described. The above-described flap hold-down 229, 230 and the upper trailing flap folder 222 will have folded upper flaps 21 and 22 downwardly upon the article in the carton. The upper side flaps 24 and 25 will, of course, have been erected to the vertical parallel position shown. Bottom side flaps 19 and 20 will have been folded vertically downwardly to depend from the respective main side panels to which they are attached.

Forward motion of the carton through the glue applying stations 32 thus coats a desired predetermined area of the confronting faces of the side flaps with glue. Upon emerging from the gluing station, the carton continues its forward travel to a side flap-folding station, generally designated 34, located near the forward end of the first unit of the apparatus. As shown in FIG. 2a and FIG. 3, there are two opposed upper side flap-folding guides 232 and two opposed lower side flap-floiding guides 234 at station 34. The side flap-folding guides on the respective sides of the apparatus are supported upon and adjusted by sets of parallel vertical rock shafts which carry crank arms thereon. The inner ends of the crank arms are pivotally connected to the folding guides, as shown, whereby the guides may be laterally adjusted as required in the successive processing of cartons of different widths. The upper folding guides 232 engage and fold the opposed side upper flaps 24 and 25 from the vertical downwardly to be adhered to the upper surfaces of the now horizontal inner flaps 21, 22. The lower flap-folding guides 234 engage the laterally outer sides of bottom side flaps 19 and 20 and fold them up horizontally under the previously folded inner flaps 16, 17 so as to adhere to the latter. During the initial engagement of the bottom folding guides 234 with their respective flaps, the weight of the carton and its contents is borne by the central skid member 155. Skid member 155 terminates at its forward end in such location relative to the bottom folding guides 234 and to the initial roller 269 of a subsequent idle roll conveyor at the exit end of the machine that the side flaps are folded upwardly simultaneously with the transfer of the carton from skid 155 to the subsequent roller conveyor.

*Air circuit, FIG. 12*

The air circuit and the elements connected thereby are shown in FIG. 12. Such circuit has a main air supply line 360 which is connected to a source (not shown) of air under a pressure such as 85–90 pounds per square inch. A branch pipe 123 leads from pipe 360 to the inlet end of a four-way solenoid valve 118, which is more fully described in the above-mentioned Brumbaugh application. Valve 118 governs the inlet and exhaust of air under pressure to the upper and lower ports, respectively, of air cylinder 94 which controls the positioning of stop 87 in the section 26 of the apparatus shown.

Other branch pipes lead from main pipe 360 to the heads of folder cylinder 225 and the heads of the cylinders 196 and 202 which adjust the carriage 180 of the second section of the apparatus vertically. Cylinders 225, 196, and 202, and the heads 362, 364, and 365 thereof, respectively, are of similar construction, except that the length and diameter of cylinder 225 are somewhat less than those of cylinders 196 and 202. Each of cylinders 225, 196, and 202, in the embodiment shown, is of the type sold under the name "Bellows Super Speed Air Motor" sold by the Bellows Company, Akron, Ohio. Each of the heads 362, 364, and 365 of such air motors includes built-in valve and solenoids, sold under the name "Bellows Electroaire Valve," likewise sold by the Bellows Company. Such valve is powered by the operating air line pressure, the pressure being electrically controlled by two small solenoids which are sealed into the end caps of the motor. Such solenoids, which are schematically indicated in FIGS. 13a, 13b, are each powered by three wires which are indicated in FIG. 12 and shown more fully in FIGS. 13a and 13b. The solenoids are under the control of low voltage circuits, to be described hereinafter; energization of one solenoid causes the piston of the motor to travel in one direction, and energization of the other solenoid causes the piston to travel in the other direction. It will be seen that the solenoids in head 362 of air motor 225 are selectively operated first to cause the piston to rise, thereby causing bending arm 221 to swing downwardly, following which the piston of motor 225 descends, thereby retracting flap-folding arm 221 into its initial, raised position.

Motors 196 and 202 are of the same size and have the solenoids in the operating heads 364 and 365 thereof, respectively, connected in parallel to operate simultaneously in the same direction. When the carriage 180 is to be lowered, such solenoids are operated to admit air into the upper ends of motors 196 and 202, and to exhaust air from the lower ends thereof. When carriage 180 is to be raised the solenoids in the heads of the motors are operated to exhaust air from the upper ends of the motors and to introduced air under pressure into the lower ends of the motors.

The compressed air supplied by pipe 360 also serves as the source of power to control the carriage adjusting checking motors 210 and 211, which function to hold the carriage in the position to which it has been moved by motors 196 and 202. Motors 210 and 211 in the embodiment shown are of the type known as "Bellows Hydro-Checks," made by the Bellows Company. The particular type of "Hydro-Checks" employed is that known as Model DCST–50, which is provided with stop check controls which permit the stopping of the piston thereof at any point in its piston travel, holding it in its stopped position as long as desired, and then permitting it to continue. Each such device includes a pipe, designated 366 in the case of motor 210, which leads oil from one end of the main motor cylinder to the other. Interposed in such pipe is a fluid operated valve shown at 367 which, when closed, locks the piston of the cylinder in place, and, when open, allows the piston to move as required. Check motor 211 is similarly provided with a by-pass pipe 366' and an air operated valve 367'. Valves 367 and 367' are under the control of three-way solenoid operated valves 369 and 369' which are supplied with air under pressure from pipe 360 through branch pipes 370 and 370', respectively. The solenoids of valves 369 and 369' are connected in parallel and when energized allow air under pressure from supply pipes 370 and 370' to escape to the atmosphere as indicated at E, valves 367 and 367' then being relieved of pressure and allowing oil to circulate through by-pass pipes 366 and 366'. When valves 369 and 369' are de-energized, valves 367 and 367' are subjected to pressure and closed to lock the check motors in position.

A branch pipe 371 from air pipe 360 also serves to supply air to two glue tanks 372 and 374, which supply glue under pressure to the upper glue applicator 235 and the lower glue applicator 234 respectively. Thus, branch pipe 371 is connected to the upper ends of the glue tanks through suitable pressure regulators at the top of each glue tank. Glue feeding pipes 375 and 376 lead to the upper and lower applicators. As we have seen, the glue applicators themselves incorporate a series of valves, which open only when connected by a flap to be coated. The glue applicators are supplied with glue under pressure at the proper time through solenoid operated valves 354 and 355 for the lower and upper glue applicators 234 and 235, respectively.

As we have seen above, each of the glue applicators is applied to a flap travelling therepast by means of a toggle-like linkage which is powered by a pneumatic motor. Such motors, which are shown in FIG. 12 at 377 and 379, are energized to press the glue applicator strongly against the flap when the flap has reached a position confronting them. The rear and forward ends of motors 377 and 379 are connected in parallel by pipes 380 and 390, respectively, which, in turn, are connected to the opposite end of a four-way solenoid valve 382 which is biased so that when de-energized it directs a fluid under pressure to the forward ends of motors 377 and 379, so as to pull the glue applicators away from the flaps. Valve 382 is under the control of a limit switch 434, to be described more particularly in connection with FIGS. 13a and 13b. Switch 434 functions to energize the coil of valve 382, thereby to direct fluid under pressure to the rear ends of cylinders 377 and 379 so as to press the glue applicators against the flap as the flap enters the glue applicator zone. After the container 10 has passed switch 434, the coil of valve 382 is de-energized, whereby to pull the glue applicators away from the flap as the flap leaves the glue applicator zone.

*The electrical control circuit for the first section, FIGS. 13a and 13b*

The electrical control circuit for the first section or unit of the apparatus is shown in FIGS. 13a and 13b, such figures when placed together along the dot-dash lines thereon depicting the entire control circuit. The circuit is supplied with three-phase alternating current through main lead wires $L_1$, $L_2$, and $L_3$. The current source may be, for example, one of 440 volts potential. Motor 149 for the conveyor chains 136 of the first section is supplied from the main circuit through a magnetic starter switch 406, as shown. Motor 116 for conveyor 27 is likewise fed from such main circuit there being a separate magnetic starter switch 404 for motor 116. The control elements for carriage adjusting motors 196 and 202, for carriage checking motors 210 and 211, for the upper trailing flap-folding means, and for the glue applicators, are fed through lower voltage circuits. In the circuit shown there is a transformer 402 having its primary connected between main leads $L_1$ and $L_3$ and its 110 volt secondary connected to the control circuits. Motor 149 may be placed under the control of manual switch 405 which permits it to be started, stopped, and reversed as desired. Normally, however, motor 149 continues to run once it has been energized by the closing of limit switch 401 which is tripped by the passage of the carton 10. The relative position in the first section of each of the limit switches incorporated in the control circuit is indicated in FIGS. 13a and 13b where they are shown located with reference to a rear column 125 and a forward column 127 of the apparatus.

The control circuit includes individual control sub-circuits for the carriage-adjusting motors 196 and 202, for the carriage-checking motors 210 and 211, for the upper trailing flap-folding mechanism, and for the glue applicators. Each of the first three of said four sub-circuits includes a transformer and an energy storing and discharging circuit. The last sub-circuit is fed by the same transformer which feeds the flap-folding controlling circuit, and merely includes its own energy storing and discharging circuit. The transformers are shown at 410, 412, and 415, respectively. The four energy storing and discharging circuit devices are shown at 411, 414, 416, and 417, respectively. Preferably such circuit devices are of the type known as the Bellows "Pulsa-Pak," sold by the Bellows Co., Akron, Ohio. The transformers are made by the same company and are designed for use in conjunction with the "Pulsa-Paks." Each "Pulsa-Pak" includes a current rectifying device which feeds its output into a storage condenser. When the control circuit is closed, the "Pulsa-Pak" releases its stored energy or charge so as instantly to energize a coil of a relay such as that of a solenoid, in this instance of the above-described Bellows "ElectroAire Valves" employed in the air motors 196 and 202 and the solenoids employed to control the "Hydro-Check" 210 and 211.

The scanning station 29 of the apparatus is designed to adjust the carriage 180 to the appropriate one of three heights, to treat containers having any one of three predetermined heights. The number of height adjustments may be greater or less than the three illustrated. The scanning station includes two photoelectric cells and associated relays 177 and 178, and three normally open limit switches 425, 426, and 427. Limit switches 425 and 426 are connected in series with the respective relays of photoelectric cells 177 and 178, such series connected relays and switches being connected in parallel with switch 427. The common lead wires from switches 425, 426, and 427 is connected to the coil of relay 419. The photoelectric cells and the three switches 425, 426, and 427 function automatically to detect the height of the container which is then entering the apparatus, and adjusts the carriage 180 to the appropriate height to fold, glue, and hold down the top flaps of the container then being treated.

The limit switches 425 and 426 are mounted on fixed column 125 and switch 427 is mounted on column 127. A tripper rod 421 is secured to the carriage 180 at the entering end thereof in position to cooperate with switches 425 and 426, and a tripper rod 422 is secured to carriage 180 at the exit end thereof in position to cooperate with switch 427. As above mentioned, limit switches 425, 426, and 427 are normally open. Suitably adjusted vertically short dogs are positioned on rod 421 so as to close the switches 425 and 426 during short portions of the vertical movement of carriage 180 as the dogs engage the arms of the respective switches 425 and 426, the switch opening after the dog has passed by it. The interruption of the beam of light to the lower photoelectric cell 177 closes the circuit through the relay of such cell. The interruption of the beam of light to the upper photoelectric cell 178 closes the circuit through the relay associated with the upper cell. The switch 427 normally remains open, and is closed by a dog on tripper rod 422 only when carriage 180 has reached a lower level appropriate for treating the shortest container of the three heights of containers which the apparatus is adapted to treat. It is to be understood that, with a suitable increase in the number of photoelectric cells and limit switches, the apparatus may be made to treat and to discriminate between a large number of different heights of containers.

The carriage 180 is automatically operated so that after passage of each filled container through the apparatus, the carriage is automatically elevated to its uppermost position where it is held until a new container enters the apparatus. Such elevation of the carriage is accomplished, in a manner to be described, by unlocking the check motors 210 and 211 and by energizing the air motors 196 and 202 to raise carriage 180 until it is stopped by the opening of a normally closed limit switch 424. This opens the contacts of relay 419 to de-energize motors 196 and 202 and to lock motors 210 and 211 in place.

The apparatus automatically adjusts carriage 180 to an elevated position, an intermediate position, or a lowermost position, depending upon the height of the container entering the apparatus. If the carton entering the apparatus should be the tallest of the three which the apparatus is designed to treat, upon the closing of limit switch 420 the carriage 180 starts its downward travel. Such travel continues until switch 425 is closed by its dog on tripper rod 421, the beam of light to photoelectric cell 178 having been interrupted by the upper side flaps of the container. The circuit to relay 419 is thus closed (through the relay of photoelectric cell 178 and switch 425), motors 196 and 202 are de-energized, and check motors 210 and 211 are locked.

If the carton entering the apparatus is of the intermediate height, the carriage 180 upon descending from its uppermost position continues through the position to which limit switch 425 is closed, since the beam of light to photoelectric cell 178 remains uninterrupted by the upstanding flaps on the carton, and thus the relay associated with such cell remains open. When the carriage reaches the position to which the respective dog on tripper rod 421 closes switch 426, the beam of light to photoelectric cell 177, having been interrupted by the upper flaps on the container, the energizing circuit to relay 419 will be completed through the relay of photoelectric cell 177 and limit switch 426.

If the container entering the apparatus has the shortest of the three heights, the carriage 180 will descend through the positions at which switches 426 and 425 are momentarily closed, since in neither of such positions is the relay of the corresponding photoelectric cell closed by interruption of the beam of light to the cell. Carriage 180, in this instance, therefore continues its downward travel until the dog on tripper rod 422 closes limit switch 427, which will have been positioned on its supporting column at the appropriate height for treating such shortest container of the three.

*Manner of operation of the control circuit*

It will be assumed that a carton 10 is entering the first section along the conveyor 27. In its travel the carton trips a limit switch 400 which operates the magnetic starter 404 of motor 116, so as to start the motor and to forward the carton into the first section of the apparatus. Upon such further travel, the carton trips a limit switch 420 which allows the electrical energy which has been stored in the "Pulsa-Pak" 411 to actuate the valves on top of the motors 196 and 202 to the lowering position. The position in which the carriage stops is controlled by the above-described photoelectric cells 177 and 178 and the limit switches 425, 426, and 427. The relay 419 is then held closed in a holding circuit. When such relay is thus energized, it opens the circuit to the solenoid valves controlling check motors 210 and 211. The flow of oil in the check motors is then stopped so that the carriage 180 is held in equilibrium at the desired level.

As the container 10 continues its travel through the first section of the apparatus, limit switch 401 is actuated, thus energizing motor 149 which drives the conveying chains 136. Plugging switch 153 will previously have stopped conveyor chains 136 in the proper position to receive the carton. The lugs 137 on such chains contact the carton and continue to move it forward through the first section of the apparatus. In this continued forward movement the container actuates limit switch 429 which allows the electrical energy which has been stored in the capacitor of "Pulsa-Pak" 414 to actuate the valve on top of the flap-folding cylinder 225, which in turn actuates the flap-folding arm 221 which folds the top trailing flap 22. At the same time that flap 22 is being folded, the upper leading flap 21 is folded inwardly by the forward advance of the container. In the advance of the container, the feed chain conveying lug 137 actuates another limit switch 430, which allows the electrical energy which has been stored in the capacitor part of "Pulsa-Pak" 414 again to actuate the valve on top of the flap-folding cylinder 225. This, in turn, allows the flap-folding arm 221 to return to its pre-folding position in readiness for the next cycle of operation.

As the container 10 continues its further travel, a further limit switch 431 is actuated thereby so as to permit air pressure to be applied to the glue tanks 372 and 374 to supply glue to the glue guns or applicators 235 and 234. Glue is actually applied to the inner side of the outer flaps of the container by pressing the glue guns against the flap. This glue gun or applicator-applying pressure is applied through air cylinders 377 and 379 and linkage which has been described above, the air cylinders being actuated through valve 382 in the reverse direction upon contact between a limit switch 434 and the container in the further forward travel of the latter. Both limit switches 431 and 434 are mounted along the central tongue or skid 155 (FIG. 3). During all this operation the container is propelled by the chain lugs 137.

After the glue has been applied to the flaps, the container continues to the plows 232 and 234 which fold the top and bottom outer flaps, respectively, by the forward motion of the container. After the other flaps are folded, the container is delivered to the second station, which is the compression unit 35.

As the feed chain completes its cycle of delivering the container to the compression unit, it actuates three limit switches 435, 436, and 437. These three limit switches respectively stop motor 116 of conveyor 27, return carriage 180 to its extreme height position, and stop the feed chains 136. Limit switches 435 and 436 are actuated by the passage of the container thereby. Limit switch 437 is actuated by the feeder lug arm 137 of chain conveyor 136. When limit switch 436 is actuated, it allows the electrical energy which has been stored in the capacitor part of "Pulsa-Pak" 414 to actuate the valves on top of the carriage cylinders 196 and 202 to the "raise" position, thus allowing the carriage 180 to return to its starting position. When carriage 180 returns to its initial, raised position, limit switch 424 is actuated which de-energizes relay 419, thus re-setting it to normal. It should be pointed out that limit switch 437 could also be placed along the chain conveyor 136 at any position following limit switch 401 rather than in the position shown. The position shown is considered to be its optimum placement.

*The second or presser section 35*

Section 35 is made up of one or more sub-sections having a horizontal table-like frame supported on a pair of opposed rear sub-columns 264 and front sub-columns 265. Such sub-columns are tied together by longitudinally extending frame members 266. The thus described frame supports a longitudinal conveyor made up of longitudinal members 267 which journal the opposite ends of a plurality of transverse conveyor rolls 269. As shown, the conveyor of section 35 is disposed in alignment with the conveyor of the first section of the apparatus. In FIG. 2b only one full sub-section and a fragment of a succeeding sub-section are shown. It will be understood that any desired number of aligned presser sub-sections may be employed, depending upon the length of time which it requires for the top flap securing adhesive or glue stably to secure the flaps.

The conveyor rolls 269 may be idle, if desired. In the apparatus shown, however, rolls 269 are connected to rotate in unison and are power driven by a geared electric motor 407 by a chain 408 (FIG. 2b) entrained over a sprocket on the output shaft of motor 407 and a sprocket on one of the interconnected conveyor rolls 269. Motor 407 is fed from main lines $L_1$, $L_2$, $L_3$, and is under the control of a manually operated switch 409 (FIG. 13b).

Rising above sub-columns 264 and 265, respectively, are parallel vertical rear and forward columns 270 and 271. The upper ends of columns 270 and 271 are connected by upper horizontal longitudinal frame members 272 and by rear and forward horizontal cross frame members 274 and 276.

Vertically adjustably supported within the thus described upper frame is a horizontally disposed longitudinally extended frame 275 which is composed of parallel longitudinal members 276 and cross frame members 277. Frame 275 is vertically adjusted by means including a laterally centrally disposed rear screw member 279 and a nut in the form of a handwheel 280 cooperating therewith and a similar forward screw 281 cooperating with a handwheel-nut 282. The lower end of screws 279 and 281 are centrally secured to frame 275 at the rear and forward ends thereof, respectively. It will be seen that the turning of handwheels 281 and 282 in one direction serves to raise carriage 275, and that the turning of the handweels in the opposite direction lowers the carriage. The far and near corners of frame 275 at both the rear and forward ends thereof are maintained level in generally the same manner as are the corners of the vertically adjustable carriage 180 of the second section of the apparatus. Thus each of columns 270 has a vertically disposed rack gear 284 affixed thereto, and the rear end of carriage 275 is provided with a cross shaft 286 carrying pinions 285 affixed to its opposite ends and meshing with the respective rack gears 284. The forward end of frame 275 is provided with a similar cross shaft 290 having pinions 289 affixed to its opposite ends and meshing with rack gears 287.

At the rear end of section 35 at a zone 36 at which the closed carton is acted upon by the first of the upper flap presser members, the apparatus is provided with a carton squaring and erecting means generally designated 291. Means 291 includes two similar opposed horizontal channel members 294 which are supported from the respective longitudinal frame members 276 between longitudinally spaced vertical depending hanger members 292. Each of members 294 journals on vertical axes a plurality of short circular cylindrical rollers 295, the inner edges of each set of which are longitudinally aligned to engage the opposite side panels of a filled carton as the carton travels therebetween. The weight of the article in the carton maintains the bottom of the carton flat upon the rollers 269 of the conveyor. When members 294 are suitably adjusted, they engage the sides of the carton in such manner as to cause them to lie true and square with respect to the base of the carton and causes the upper glue-coated flaps of the carton to shift, if necessary, to maintain such condition until the glue becomes set.

To provide for the suitable lateral adjustment of members 294, as well as to permit them a limited freedom of angular movement with respect to their lengths, members 294 are supported from the bottoms of hangers 292 on horizontal transverse screws 296 which have threaded engagement with the hangers and may be suitably rotated by handwheel 297. The manner of connection between the inner ends of screws 296 and each of members 294 will be more readily understood upon consideration of FIGS. 4 and 7. The assembly connecting screws 296 and members 294 each includes a block 300 affixed to the outer edge of member 294, the block having a bore 301 therein in which a reduced diameter pilot pin 302 on the forward end of screw 296 is slidably received. Outwardly of pilot pin 301 the screw 296 is provided with spaced opposed collars between which a short thrust sleeve 304 is journalled. Opposite sides of sleeve 304 are provided with oppositely extending pins 306 which extend through the outer ends of arms 305 of a yoke member 308 which is pivotally mounted on a vertical pivot pin 307 to a further block 309 which is affixed to the outer edge of member 294. The other, oppositely extending arm 310 of the yoke is provided with a roller 311 which is constantly urged against the outer surface of member 294 by a coil torsion spring 312 which urges arm 310 clockwise (FIG. 7). The described mounting assembly 299 permits members 294 a limited freedom of motion toward and away from the center of the conveyor, whereby to align themselves with the sides of the carton, thereby to retain resilient pressure upon the carton as it passes between opposite members 290. Such construction also gives the truing rolls a cushioned, shock-absorbing action as they are initially engaged by the container.

Frame 275 of section 35 carries a plurality of vertically yieldably mounted presser units 314 which ride upon the top of the closed cartons as the latter pass through section 35, whereby to press the glue coated upper flaps of the carton downwardly into final position. Each presser unit 314 is journalled between the lower ends of a pair of laterally spaced supporting arms of links 315. Each of the links, which are arranged in laterally aligned pairs, is pivotally connected to the respective longitudinal frame member 276 by a pivot pin 316, as shown. Preferably the presser units 314 are maintained in a lower terminal position, when no carton is passing therebeneath, by spaced longitudinal stop members 317 which engage the lower ends of supporting arms 315. Stop members 317 are supported, as shown in FIG. 2b, by longitudinally spaced hanger members 319. In their lowermost terminal position, as well as in positions which they occupy while cooperating with cartons passing therebeneath, the links 315 are inclined downwardly and forwardly, so that the presser units engage the upper forward edge of a carton without appreciable shock and are progressively raised in the travel of the carton.

A preferred embodiment of presser unit 314 is indicated in FIG. 2b and is particularly shown in FIGS. 5 and 6. In such embodiment the lower ends of opposed links 315 are connected to a cross shaft 320 as by being pinned thereto as indicated at 321. Inwardly of each link 315 a circular end disc member 322 is journalled on shaft 320 by a bearing 325, the opposite members 322 being connected by a cross tube 324 which surrounds shaft 320. End members 322 are thus connected to rotate together about the shaft. Extending between end members 322 at equal radial distances from shaft 320 and spaced equally angularly about such shaft are a plurality of rollers 326 (four shown). Rollers 326 are connected to the respective end members 322 through the medium of stub shafts 329 and bearings 330, as shown in FIG. 6.

Entrained about the rollers 326 is a flexible belt 327 which may be made, for example, of duck webbing. Belt 327 is of such length that, as for example, should the belt, first contact a carton intermediate the length of one run therewith, as shown in FIG. 5, such run will be deflected appreciably radially inwardly. As the carton continues its travel to the right in FIG. 5, presser unit 314 rotates as a whole, as required, about shaft 320, and belt 327 travels as required about the freely rotatable supporting rollers 326. The belt 327 thus functions smoothly to enter upon the top of the carton and to travel thereover with a kind of ironing action, dropping off the rear top edge of the carton in a smooth, gentle manner. Although the described presser members are preferably employed with the belt 327, such belt may, if desired, be omitted. In such case, the rollers 326 themselves engage and roll along the upper surface of the container. When one of the rollers 326 reaches the forward upper corner of the container, it rolls down the forward vertical surface thereof for some distance. The unit 314 rotates as a whole about its axis to allow smooth engagement between the unit 314 and a container both as the container initially engages the unit and as the container leaves the unit.

Although only one embodiment of the apparatus of the invention has been illustrated in the drawings and described in the foregoing specification, it is to be expressly understood that various changes, such as in the relative dimensions of the parts, the materials used and the like, may be made therein without departing from the spirit and scope of the invention, as will now be apparent to those skilled in the art.

What is claimed is:

1. An apparatus for processing containers having upper flaps, comprising a conveyor for supporting the filled container, a carriage confronting the conveyor and adjustable between first and second terminal positions toward and away from the conveyor, respectively, to cooperate with containers of different heights travelling therepast, upper flap treating mechanism on the carriage, means to adjust the carriage to and to maintain it at its first terminal position when there is no container passing through the apparatus, and means responsive to the entry of a container into the apparatus to control the carriage-adjusting means to adjust the carriage toward the conveyor to a position appropriate for the treating of the upper flap of the container by the mechanism on the carriage and to maintain the carriage at such position.

2. Apparatus as defined by claim 1, comprising a control circuit for the carriage-adjusting means, and a limit switch in advance of the carriage disposed to be operated upon approach of a container to the carriage to initiate adjusting movement of the carriage.

3. Apparatus as defined in claim 2, comprising an elongated fixed frame past which the conveyor extends, the carriage is elongated and is supported on the frame for movement with respect thereto, and wherein the carriage-adjusting means comprises a plurality of power means spaced along the frame and the carriage and connected thereto for simultaneous synchronous operation.

4. Apparatus as defined by claim 3, wherein the power means are fluid operated, and comprising means for mechanically synchronizing the motion of the two ends and of the corners of the carriage.

5. Apparatus as defined in claim 3, wherein the power means are fluid operated reciprocable motors, and comprising a plurality of carriage-checking devices spaced longitudinally of the carriage, and means for unlocking the carriage-checking devices upon energization of the power means and locking the carriage-checking devices upon de-energization of the power means.

6. An apparatus for processing containers having upper flaps, comprising a generally horizontal conveyor for supporting the filled container, a carriage confronting the conveyor and adjustable vertically between an upper and a lower terminal position toward and away from the conveyor, respectively, to cooperate with containers of different heights travelling therepast, upper flap treating mechanism on the carriage, means to adjust the carriage to and to maintain it at its upper terminal position when there is no container passing through the apparatus, and means responsive to the entry of a container into the apparatus to control the carriage-adjusting means to adjust the carriage downwardly to a position appropriate for the treating of the upper flap of the container by the mechanism on the carriage and to maintain the carriage at such position.

7. Apparatus as defined in claim 6, wherein the conveyor has a first driven section in advance of the carriage, a second idle section extending beneath the carriage, and driven means at the second section of the conveyor adapted to engage the rear of the container to impel it through the apparatus beneath the carriage.

8. Apparatus as defined in claim 7, wherein the driven means comprises a chain having a run extending parallel to the conveyor, at least one abutment on the chain which lies above the conveyor in position to engage the rear surface of the container along the second section of the conveyor, means to drive the chain, and means to control the driving means so that the chain is stopped, after impelling a container through the apparatus, in immediate position to receive the next container presented to the second section of the conveyor.

9. An apparatus for processing containers having upper flaps, comprising a conveyor for supporting the filled container, a carriage confronting the conveyor and adjustable toward and away from the conveyor to cooperate with containers of different heights, travelling therepast, upper flap-treating mechanism on the carriage, and means to detect the height of a container entering between the conveyor and the carriage and to adjust the carriage to the proper position relative to the conveyor for the mechanism thereon to treat the upper flap of the container, said last named means comprising power means selectively to move the carriage toward and away from the conveyor between first outer and second inner terminal positions, respectively, a control circuit, limit means in the control circuit for stopping the carriage in its respective terminal positions, means in the control circuit for controlling the power means to drive the carriage to its outer terminal position after passage of a treated container from beneath the carriage, and means in the circuit for controlling the power means to drive the carriage towards its inner terminal position upon the approach of a container to be treated toward the carriage, a further limit means disposed to be operated by the carriage at a predetermined intermediate position thereof, a photoelectric cell generally parallel to the conveyor, a light source for said photo-electric cell, the photo-electric cell and the light source being so disposed that the light beam is interrupted by the upper end of a container of intermediate height as the container travels therepast on the conveyor, and a relay operated by the photo-electric cell and having control means in circuit with the further limit means in the control circuit so as to stop the travel of the carriage at such intermediate position of the carriage.

10. An apparatus for processing containers having upper flaps, comprising a conveyor for supporting the filled container, a carriage confronting the conveyor and adjustable toward and away from the conveyor to cooperate with containers of different heights travelling therepast, upper flap-treating mechanism on the carriage, and means to detect the height of a container entering between the conveyor and the carriage and to adjust the carriage to the proper position relative to the conveyor for the mechanism thereon to treat the upper flap of the container, said last named means comprising power means selectively to move the carriage toward and away from the conveyor between first outer and second inner terminal positions, respectively, an electrical control circuit, limit switches in the control circuit for stopping the carriage in its respective terminal positions, means in the control circuit for controlling the power means to drive the carriage to its outer terminal position after passage of a treated container from beneath the carriage, and means in the circuit for controlling the power means to drive the carriage towards its inner terminal position upon the approach of a container to be treated toward the carriage, a further limit switch disposed to be operated by the carriage at a predetermined intermediate position thereof, a photoelectric cell, a source of light directing a light beam at the photoelectric cell generally parallel to the conveyor, the photoelectric cell and the light source being so disposed that the light beam is interrupted by the upper end of a container of intermediate height as the container travels therepast on the conveyor, and a relay operated by the photoelectric cell and having contacts in circuit with the further limit switch so as to stop the travel of the carriage at such intermediate position of the carriage.

11. Apparatus as defined in claim 10, comprising means selectively to lock the carriage at said terminal positions and in said intermediate position.

12. Apparatus as defined in claim 11, wherein the photo-electric cell and the source of light are mounted on opposite sides of the carriage and the further limit switch is operated by movement of the carriage so that further limit switch is operated to stop the carriage when the carriage reaches said intermediate position.

13. Apparatus as defined in claim 12 for treating containers of a plurality of different heights, comprising a plurality of photoelectric cells disposed in general alignment and spaced varying fixed distances from the face of the carriage confronting conveyor, a source of a light beam for each photoelectric cell, a plurality of relays operated by the respective photoelectric cells, and a plurality of further limit switches, sub-circuits each having contacts of a respective relay and switch in series therein, said sub-circuits being connected in parallel in the control circuit of the apparatus.

14. An apparatus for processing containers having upper flaps, comprising a generally horizontal conveyor for supporting the filled container, a carriage overlying the conveyor and adjustable vertically toward and away from the conveyor to cooperate with containers of different heights travelling therepast, upper flap-treating mechanism on the carriage, means to detect the height of a container on the conveyor entering beneath the carriage, and means to adjust the carriage to the proper position relative to the conveyor for the mechanism thereon to treat the upper flap of the container, said last named means comprising electrically controlled power means selectively to move the carriage vertically in reverse directions between an upper terminal position and a lower terminal position and selectively to lock the carriage in its terminal positions and in at least one predetermined position intermediate the terminal positions, an electrical control circuit, limit switch means in the control circuit for stopping the carriage in its respective terminal positions, means in the control circuit for controlling the power means to raise the carriage to its upper terminal position after passage of a treated container from beneath the carriage, means in the circuit for controlling the power means to lower the carriage upon the approach of a container to be treated toward the carriage, a further limit switch disposed to be operated by the carriage at said predetermined intermediate position thereof, a photoelectric cell, a source of light directing a light beam at the photoelectric cell generally parallel to the conveyor, the photoelectric cell and the light source being so disposed that the light beam is interrupted by the upper end of a container of intermediate height as the container travels therepast on the conveyor, and a relay operated by the photoelectric cell and having contacts in circuit with the further limit switch so as to stop the downward travel of the carriage at the intermediate position of the carriage.

15. Apparatus as defined in claim 14, wherein the photoelectric cell and the source of light are fixedly mounted on opposite sides of the carriage, and the further limit switch is operated by movement of the carriage so that the further limit switch is operated to stop the carriage when the carriage reaches said intermediate position.

16. Apparatus as defined in claim 15 for treating containers of a plurality of different heights, comprising a plurality of photoelectric cells disposed in general alignment and spaced varying fixed distances from the lower face of the carriage, a source of light beam for each photoelectric cell, a plurality of relays operated by the respective photoelectric cells, and a plurality of further limit switches, sub-circuits each having contacts of a respective relay and switch in series therein, said sub-circuits being connected in parallel in the control circuit of the apparatus.

17. Apparatus as defined in claim 16 adapted to treat containers of $n$ different heights, wherein there are employed $n-1$ photoelectric cells, light sources therefor, and sub-circuits each including a relay operated by its respective photoelectric cell and a further limit switch, said limit switches being mounted at different predetermined heights so as to be sequentially operated when the carriage descends to their respective level, and wherein the limit switch means comprises an upper limit switch for stopping the carriage in its upper terminal position and a lower limit switch for stopping the carriage in its lower terminal position, means for operating the lower terminal switch by downward movement of the carriage, said last named means being so constructed and arranged that at the lower terminal position of the carriage it is located to treat the shortest of the containers being processed.

18. An apparatus for processing containers having upper flaps, comprising a conveyor for supporting the filled container, a carriage confronting the conveyor and adjustable between first and second terminal positions toward and away from the conveyor, respectively, to cooperate with containers of different heights travelling therepast, means for adjusting said carriage, upper flap treating mechanism on the carriage, photoelectric means responsive to the entry of a container into the apparatus to control the carriage-adjusting means to adjust the carriage to a position appropriate for the treating of the upper flap of the container by the mechanism on the carriage and to maintain the carriage at such position.

19. An apparatus for processing containers having upper flaps, comprising a generally horizontal conveyor for supporting the filled container, a carriage confronting the conveyor and adjustable vertically between an upper and a lower terminal position toward and away from the conveyor, respectively, to cooperate with containers of different heights travelling therepast, means for adjusting said carriage, upper flap treating mechanism on the carriage, and photoelectric means responsive to the entry of a container into the apparatus to control the carriage-adjusting means to adjust the carriage to a position appropriate for the treating of the upper flap of the container by the mechanism on the carriage and to maintain the carriage at such position.

20. An apparatus for processing containers having upper flaps, comprising a conveyor for supporting the filled container, a carriage confronting the conveyor and adjustable toward and away from the conveyor to cooperate with containers of different heights, travelling therepast, upper flap-treating mechanism on the carriage, and means to detect the height of a container entering between the conveyor and the carriage and to adjust the carriage to the proper position relative to the conveyor for the mechanism thereon to treat the upper flap of the container, said last named means comprising power means selectively to move the carriage toward and away from the conveyor between first outer and second inner terminal positions, respectively, a control circuit, limit means in the control circuit for stopping the carriage in its respective terminal positions, a further limit means disposed to be operated by the carriage at a predetermined intermediate position thereof, a photoelectric cell generally parallel to the conveyor, a light source for said photoelectric cell, the photoelectric cell and the light source being so disposed that the light beam is interrupted by the upper end of a container of intermediate height as the container travels therepast on the conveyor, and a relay operated by the photoelectric cell and having control means in circuit with the further limit means in the control circuit so as to stop the travel of the carriage at such intermediate position of the carriage.

21. An apparatus for processing containers having upper flaps, comprising a conveyor for supporting the filled container, a carriage confronting the conveyor and adjustable toward and away from the conveyor to cooperate with containers of different heights travelling therepast, upper flap-treating mechanism on the carriage, and means to detect the height of a container entering between the conveyor and the carriage and to adjust the carriage to the proper position relative to the conveyor for the mechanism thereon to treat the upper flap of the container, said last named means comprising power means selectively to move the carriage toward and away from the conveyor between first outer and second inner terminal positions, respectively, an electrical control circuit, limit switches in the control circuit for stopping the carriage in its respective terminal positions, a further limit switch disposed to be operated by the carriage at a predetermined intermediate position thereof, a photoelectric cell, a source of light directing a light beam at the photoelectric cell generally parallel to the conveyor, the photoelectric cell and the light source being so disposed that the light beam is interrupted by the upper end of a container of intermediate height as the container travels therepast on the conveyor, and a relay operated by the photoelectric cell and having contacts in circuit with the further limit switch so as to stop the travel of the carriage at such intermediate position of the carriage.

22. Apparatus as defined in claim 21, comprising means selectively to lock the carriage at said terminal positions and in said intermediate position.

23. Apparatus as defined in claim 22, wherein the photoelectric cell and the source of light are mounted on opposite sides of the carriage and the further limit switch is operated by movement of the carriage so that further limit switch is operated to stop the carriage when the carriage reaches said intermediate position.

References Cited by the Examiner

UNITED STATES PATENTS

| | | | |
|---|---|---|---|
| 2,324,401 | 7/43 | Kimball | 53—75 |
| 2,366,888 | 1/45 | Werden et al. | 53—75 |
| 2,550,928 | 5/51 | Kay | 53—75 |
| 2,805,533 | 9/57 | Holstebroe | 53—387 |
| 2,859,727 | 11/58 | Phin et al. | 118—3 |
| 2,896,569 | 7/59 | Ferguson et al. | 118—3 |
| 2,909,875 | 10/59 | Imbs | 53—76 |
| 2,922,266 | 1/60 | Haffner | 53—387 |
| 2,982,064 | 5/61 | Hopkinson | 53—76 |
| 3,085,376 | 4/63 | Ferguson | 53—75 |

FRANK E. BAILEY, *Primary Examiner.*

ROBERT A. LEIGHEY, TRAVIS S. McGEHEE,
*Examiners.*